(12) United States Patent
Miskovic et al.

(10) Patent No.: US 8,034,405 B2
(45) Date of Patent: Oct. 11, 2011

(54) METHOD FOR COATING A SUBSTRATE WITH A SOLVENT-FREE YIELD POINT FLUID

(75) Inventors: Michel Miskovic, Compiegne (FR); Jean-Francois Chartrel, Cuts (FR)

(73) Assignee: Bostik Findley S.A., Puteaux (FR)

( * ) Notice: Subject to any disclaimer, the term of this patent is extended or adjusted under 35 U.S.C. 154(b) by 108 days.

(21) Appl. No.: 12/501,753

(22) Filed: Jul. 13, 2009

(65) Prior Publication Data

US 2009/0275249 A1 Nov. 5, 2009

Related U.S. Application Data

(63) Continuation of application No. 10/882,147, filed on Jul. 1, 2004, now abandoned.

(30) Foreign Application Priority Data

Jul. 1, 2003 (FR) ...................................... 03 07971

(51) Int. Cl.
*B05D 3/12* (2006.01)
(52) U.S. Cl. ........ 427/171; 427/175; 427/176; 427/346; 427/389.9; 427/394
(58) Field of Classification Search ........................ None
See application file for complete search history.

(56) References Cited

U.S. PATENT DOCUMENTS

| | | | |
|---|---|---|---|
| 3,891,785 A | 6/1975 | Zemlin | |
| 5,004,643 A | 4/1991 | Caldwell | |
| 5,209,965 A | 5/1993 | Caldwell | |
| 5,418,051 A | 5/1995 | Caldwell | |
| 5,698,303 A | 12/1997 | Caldwell | |
| 5,846,604 A | 12/1998 | Caldwell | |
| 5,856,245 A | 1/1999 | Caldwell | |
| 5,869,172 A | 2/1999 | Caldwell | |
| 5,874,164 A | 2/1999 | Caldwell | |
| 5,876,792 A | 3/1999 | Caldwell | |
| 5,912,116 A | 6/1999 | Caldwell | |
| 5,935,637 A | 8/1999 | Schmermund et al. | |
| 5,954,902 A | 9/1999 | Caldwell | |
| 5,955,533 A | 9/1999 | Miskovic et al. | |
| 5,958,137 A | 9/1999 | Caldwell | |
| 6,040,251 A | 3/2000 | Caldwell | |
| 6,083,602 A | 7/2000 | Caldwell | |
| 6,129,978 A | 10/2000 | Caldwell | |
| 6,312,523 B1 | 11/2001 | Caldwell | |
| 6,617,369 B2 * | 9/2003 | Parfondry et al. | 521/174 |
| 6,805,905 B2 * | 10/2004 | von Wolff et al. | 427/208.2 |
| 2001/0017102 A1 | 8/2001 | Caldwell | |
| 2002/0088396 A1 | 7/2002 | Caldwell | |
| 2003/0099895 A1 | 5/2003 | Barthel et al. | |

* cited by examiner

*Primary Examiner* — Erma Cameron
(74) *Attorney, Agent, or Firm* — Millen, White, Zelano & Branigan, P.C.

(57) ABSTRACT

The invention relates to a method for coating a substrate with a fluid. This method comprises the steps: (i) of supply of a substrate and of a yield point fluid; and (ii) of shearing of the fluid and of application of the fluid to the substrate, the fluid supplied comprising a solvent-free reactive polyurethane mixture.

47 Claims, No Drawings

METHOD FOR COATING A SUBSTRATE WITH A SOLVENT-FREE YIELD POINT FLUID

This application is a continuation of U.S. patent application Ser. No. 10/882,147, filed Jul. 1, 2004 now abandoned, which is incorporated by reference herein.

The invention relates to a novel method for coating a substrate with a solvent-free yield point fluid, particularly with a fluid comprising a reactive polyurethane mixture.

The term "coating" means the application of a fluid or fluidized substance to a support or substrate and, by extension, the layer of substance deposited as the coating itself.

Adhesives are frequently used to coat substrates such as woven or knitted textiles employed in the manufacture of self-clinging textiles. The coating reinforces the mechanical properties of these woven or knitted textiles, which can then be processed. After coating, it is possible to longitudinally cut and trim these textiles (for example into pellets) in a desired form, without distorting or defibrating them.

The woven or knitted textiles can present single yarns or strands of filaments of natural and/or synthetic fibres (for example, cotton, polypropylene, polyamide and polyester).

Adhesives routinely used to coat substrates are two-component reactive polyurethanes (PU2K) in a solvent. The solvent used is generally of the acetone, butanone, or ethyl acetate type, and serves to adjust the fluidity of the adhesive. Such mixtures are used in sizing machines with overflow or recycling rolls. It is accordingly necessary to find a compromise between an adhesive that is sufficiently fluid to wet the textile but also sufficiently viscous to avoid passing through it. It is particularly difficult to obtain a correct wetting of the substrate when the latter presents high reliefs, as in the case of embossed textiles. Increasing the fluidity of the fluid incurs the risk of enabling the mixture to pass through the textile, which is harmful to its properties. Typically, the quantity of adhesive deposited varies between 100 and 240 mL/m$^2$ and the weight obtained varies between 15 and 40 g/m$^2$, depending on the substrates.

The method of coating with a mixture in a solvent further requires a passage of the substrate through a ventilated drying tunnel. At the tunnel exit, the coated substrate must present no (or very little) residual stickiness in order to permit its spooling. However, the passage through the tunnel limits the speed of the production line (an order of magnitude being 10 m/min) and hence, the workshop production rate. Moreover, the complete crosslinking of the adhesive deposited by coating is only achieved after about a week, which in turn creates logistic constraints as regards storage.

Furthermore, the use of glues and adhesives in a solvent raises problems of inflammability, exposure and atmospheric releases. In particular, the evaporation of the residual solvent during storage of the coated substrate imposes a set of safety constraints which adds to the cost of the finished product. Moreover, the solvents cause the emission of volatile organic compounds.

An alternative to the solvated two-component reactive polyurethane mixtures (PU2K) is offered by the use of aqueous dispersions like, for example, polyurethane dispersions (PUD). Unfortunately, these aqueous dispersions are highly penalizing in terms of processing. The evaporation of the water requires a great deal of energy, drastically reduces the production rates (the substrate speed is typically reduced by a factor of three) and usually requires very long drying tunnels (that is generally 30% longer than the tunnels required with solvated polyurethane mixtures).

The methods using solvent mixtures are therefore unsatisfactory, both in terms of energy cost, and for reasons of control of the fluidity of the mixture.

An alternative to the solvated mixtures is offered by the solvent-free HMPUR adhesives (Reactive Hot-Melt Polyurethanes), which generally comprise isocyanate prepolymers. In particular, mono-component polyurethane adhesives are known among the HMPUR adhesives. The HMPUR adhesives are generally solid at ambient temperature, hot-meltable, and their application temperature generally extends from 85° C. to 140° C. Their viscosity at the time of application can be adjusted in a range generally extending from 5000 to 600 000 mPa·s depending on the specific conditions. However, these adhesives do not wet the substrates sufficiently at the maximum application temperatures imposed by certain types of substrates such as textile substrates. Furthermore, the simultaneous adjustment of the viscosity of the HMPUR adhesives and of their cohesion build-up is difficult. Moreover, the use of such adhesives gives rise to a residual stickiness on the substrate coating surface.

There is therefore a need for a method for coating a substrate with a fluid, without solvent, particularly a fluid comprising a polyurethane, which offers a satisfactory wetting of the substrate.

The invention relates to a method for coating a substrate with a fluid, comprising the steps (i) of supply of a substrate and of a yield point fluid and (ii) of shearing of the fluid and of application of the fluid to the substrate, in which the fluid supplied comprises a solvent-free reactive polyurethane mixture.

In preferred embodiments, the invention also comprises one or a plurality of the following characteristics:

- the reactive mixture supplied comprises characteristics of; Brookfield viscosity at 23° C. between 100 and 200 000 mPa·s, preferably between 200 and 4000 mPa·s, yield point between 1 and 5000 Pa, preferably between 10 and 500 Pa, and yield point lag time between 1 and 20 seconds and preferably between 2 and 10 seconds;
- the reactive polyurethane mixture supplied comprises at least one polyol, at least one polyisocyanate and at least one polyamine of which the quantity represents 0.1 to 3% of the total weight of the reactive mixture;
- the viscosity of the fluid decreases when a shear stress is applied to the fluid;
- the shearing in step (ii) is obtained by setting the substrate in relative motion in relation to the fluid;
- the method further comprises a step (iii) of stretching of the substrate, at least partially concomitant with the fluid shearing step,
- the substrate supplied in step (i) is a meshed substrate and the step (iii) is a step of stretching of the meshes of the substrate;
- the method further comprises a step (iv) of heating of the substrate;
- the reactive mixture supplied comprises at least one aromatic polyamine;
- the reactive mixture supplied comprises at least one polyether polyol, with molecular weight between 200 and 9000 and with hydroxyl functionality between 2.0 et 4.6;
- the reactive mixture supplied presents an NCO/OH ratio between 1 and 2, and preferably between 1.1 and 1.4;
- the reactive mixture supplied comprises a catalyst.

The invention also relates to a coated substrate which can be obtained by the method for coating a substrate according to the invention. According to a preferred embodiment, the substrate comprises a self-clinging textile.

Other features and advantages of the invention will appear on the reading of the following description of preferred embodiments of the invention, given as examples.

The invention proposes a method for coating a substrate with a solvent-free yield point fluid, comprising the steps: of supply of a substrate and of a solvent-free yield point fluid; of shearing of the fluid and application of the fluid to the substrate, in which the fluid supplied comprises a solvent-free reactive polyurethane mixture.

The method according to the invention therefore proposes to exert a shear stress on a solvent-free yield point fluid and to apply the fluid to a 1 substrate. The shear stress exerted on the fluid must be sufficient to overcome the yield point of this fluid, which is then able to flow. When this threshold is crossed, the fluid can correctly wet the substrate. When the shear stress again falls below the yield point (for example when it is released), the fluid no longer flows.

It is therefore possible to achieve a coating of a substrate, which correctly wets this substrate without necessarily passing through it, by adjusting the shear stress, its time of occurrence, and the time of application of the fluid.

The term "solvent-free fluid" means a fluid comprising less than 2%, preferably less than 1%, and advantageously less than 500 ppm of an organic solvent, for example of the acetone, butanone or ethyl acetate type, of the total weight of the fluid.

The implementation of such a method for coating a substrate such as a woven or knitted textile hence makes it possible to:
- obtain a sufficient fluidity for the wetting followed by the coating of a substrate, particularly at ambient temperature;
- increase the speed of a production line of coated substrate in comparison with methods using a solvent-based fluid, which require a limiting drying step of the coated fluid;
- manipulate a solvent-free mixture (and thereby reduce the risks of inflammability and meet the regulatory requirements).

It should be observed that such a method can be put into practice via various devices, for example, roll coating devices (such as sizing machines) or lip nozzles. In each of these two cases, the fluid shearing step can further be partially or totally concomitant with the fluid application step. The application of the fluid to the substrate can then begin before or after the shearing step: the chronology of the beginning of the fluid shearing and application steps can therefore be reversed, without going beyond the framework of the invention. Furthermore, it is important to emphasize that the method according to the invention can be put into practice very simply. For example, the use of a simple scraper or spatula serves to exert a sufficient shear stress to overcome the yield point of the fluid and allows its application to a substrate, in order to obtain the aforementioned effects.

The solvent-free reactive polyurethane mixture according to the invention can be characterized by its physical properties. In particular, a solvent-free reactive polyurethane mixture suitable for coating a substrate may have the following characteristics:
- a viscosity measured by a standard Brookfield viscometer at 23° C. between 100 and 200 000 mPa·s, preferably between 200 and 4000 mPa·s and
- a yield point between 1 and 5000 Pa, preferably between 10 and 500 Pa; and
- a yield point lag time between 1 and 20 seconds and preferably between 2 and 10 seconds.

Such a physical profile also permits easy pumping of the mixture.

The fluid supplied may further advantageously exhibit similar properties to those of shear-thinning, plastic, pseudoplastic or thixotropic fluids. More precisely, the fluid supplied may advantageously exhibit a viscosity which decreases when a stress is applied to it and which, as required, increases when the stress ceases or decreases.

When such a fluid is sheared, its viscosity decreases, thus making it fitter for wetting the substrate. After shearing, the fluid at least partially recovers its initial viscosity, and indeed, reaches a viscosity higher than the initial viscosity when, for example, the fluid is the subject of a chemical reaction such as polymerization or crosslinking. However, the fluid can preserve a Newtonian behaviour, once the yield point is exceeded.

Thus, the shearing of such a fluid not only causes a correct wetting of the substrate surface but, in addition, the fluid recovers cohesiveness (immediately, if necessary) after the shearing has diminished or ceased. Supplying such a fluid hence permits good penetration into the weft of the substrate (wetting) without necessarily passing through it, as well as improved control of the (viscous or liquid) state of the fluid.

The shearing of the fluid can be obtained by setting the substrate in relative motion in relation to the fluid. This is, for example, the case when the substrate takes the form of a moving strip, against which the fluid is applied. In this example, the movement of the substrate strip causes a shearing of the fluid: the shearing and application steps are at least partially concomitant.

The relative speed of the substrate with respect to the fluid can further be adjusted (between 1 and 200 m/min, preferably between 10 and 50 m/min) jointly with the physicochemical properties of the fluid, in order to permit an accurate control of the weight deposited, for example between 10 and 240 g/m$^2$, depending on the relief of the substrate. Such an adjustment further serves to obtain various properties of the substrate, in particular when the substrate takes the form of a woven or knitted textile and depending on the planned application. These applications include: weave binding by coating, cropping of substrate plush loops, longitudinal or cross cutting with trimmer, thermal or ultrasonic butt welding and selvedges. Such a coating method, according to the invention, is further particularly ideal for coating self-clinging textiles and also serves to obtain a tighter and brighter coating than with the methods of the prior art.

The coating method according to the invention can further comprise a step of stretching of the substrate, at least partially concomitant with the fluid shearing step. The stretching of the substrate leads to an opening of the relief of the substrate. This may be an opening of the filament network (woven or knitted substrates) or of the meshes of the substrate, as applicable. This improves the wetting of the substrate fibres. The substrate stretching step can further be fully concomitant with the fluid shearing step.

When the substrate supplied is a meshed substrate, the stretching in question more specifically concerns the meshes of the substrate.

For a better result, the coating method according to the invention can further comprise a step of heating of the substrate, for example in an oven. When this is carried out after the fluid is applied to the substrate, the heating step first increases the fluidity of the mixture, thereby improving the impregnation of the substrate, then if applicable, can lead to a crosslinking (or a cohesion build-up) of the fluid. The heating step therefore not only serves to improve the mechanical properties of the coated substrate, but also to substantially improve the visual appearance of the coating.

It is also possible to add a substrate preheating step, in order to improve the wetting and depending on the fluid considered. A substrate heating step can therefore take place before and/or after the application of the fluid to the substrate.

Advantageously, the fluid supplied can comprise a solvent-free reactive polyurethane mixture comprising: at least one polyol; at least one polyisocyanate; and at least one polyamine of which the quantity typically represents 0.1 to 3% of the total weight of the reactive mixture.

Due to their simultaneous presence, both the polyamines and the polyols will react, in competition, with the polyisocyanates present to form a polyurethane. However, the reaction preferentially occurs between the polyisocyanate and the polyamine.

This preferential reaction between the polyisocyanate and the polyamine allows a rapid build-up of the viscosity of the mixture during the mixing of the components, and, accordingly, the obtaining of a yield point. Depending on the type of polyamine used, it is possible, for a given polyisocyanate, to adjust and control the kinetics of obtaining the yield point as a function of the quantity of polyamines present in the reactive mixture. More particularly, the quantity of polyamine to be incorporated to obtain the desired yield point depends on the percentage of amine groups related to the sum of hydroxyl groups provided by the polyols. The quantity of polyamine is generally between 0.1 and 3% by weight of the reactive mixture, depending on the type of polyamine. When the yield point is exceeded, for example, by a mechanical effect, the fluidity of the mixture increases, allowing the coating of a substrate such as a woven or knitted textile, by obtaining a good wetting of the substrate surface.

Furthermore, all the polyisocyanates known to a person skilled in the art can normally be used.

The use of a solvent-free reactive polyurethane mixture in the method according to the injection for coating a substrate such as a woven or knitted textile therefore makes it possible to:

obtain a sufficient fluidity for the coating of the substrate, particularly at ambient temperature;
obtain a rapid cohesion build-up after shearing in order to avoid passing through the substrate (for example the weft of a textile);
increase the speed of a coated substrate production line (between 1 and 200 m/min, preferably between 10 and 50 m/min) by adjusting the reactivity of the reactive mixture described above;
easily adjust the formulation of the mixture to specific needs, for example the incorporation of UV stabilizers and optical tracers, and the fire-retarding of the substrate;
obtain a production cost similar to or lower than the solutions known in the prior art.

The reactive mixture can further comprise at least one aromatic polyamine. Among the aromatic polyamines with which it is possible, for a given polyisocyanate, to adjust and to control the kinetics of obtaining a yield point, examples can be cited including: 3,5-diethyltoluene-2,4-diamine; 3,5-diethyltoluene-2,6-diamine; 4,4'-methylene-bis-2,6-diethylaniline; 4,4'-methylenebis(2,6-diethyl-3-chloroaniline); 4,4'-methylenebis(aniline).

The reactive mixture can further comprise a polyol selected among the polyether polyols with molecular weight between 200 and 9000 and with hydroxyl functionality between 2.0 and 4.6.

Examples of aliphatic or aromatic polyether polyols which may be suitable include oxyalkyl derivates of diols (ethylene glycol, propylene glycol) or triols (glycerol, trimethylolpropane, hexane-1,2,6-triol), polymers of ethylene oxide, propylene oxide or butylene oxide, copolymers of ethylene oxide and propylene oxide, as well as oxyalkyl derivatives of diphenyls such as the oxyethyl and oxypropyl derivatives in position 4,4'- of diphenylmethane.

Also suitable are oxypropyl derivatives of glycol and/or glycerol, polymers of propylene or butylene oxide and copolymers of ethylene oxide and propylene oxide. Advantageously, the aforementioned polyols are mixtures of polyols with an amorphous majority structure.

The solvent-free reactive polyurethane mixture can further comprise a resin portion with at least one polyol and at least one polyamine and a hardener portion comprising at least one polyisocyanate. The polyamine (or a mixture of polyamines) present in the resin portion can present various structures and molecular weights compatible and stable with polyols. An important advantage of the composition thereby obtained is the preferential reaction between polyisocyanates and polyamines during the mixing of the resin and hardener portions, thereby permitting a rapid build-up of the viscosity of the mixture after coating the substrate. Depending on the type of polyamine used, it is possible, for a given polyisocyanate, to adjust and control the kinetics of obtaining a yield point, as indicated above.

The isocyanates and polyisocyanates belong to the group of aromatic, aliphatic, cycloaliphatic polyisocyanates, well known to a person skilled in the art, as well as mixtures thereof. Examples of aromatic polyisocyanates include diphenylmethane diisocyanate (MDI), particularly diphenylmethane-4,4'-diisocyanate, diphenylmethane-2,4'-diisocyanate, toluene diisocyanate (TDI), particularly toluene-2,4-diisocyanate and toluene-2,6-diisocyanate. Examples of aliphatic polyisocyanates include adducts of hexamethylene diisocyanate (HMDI). Examples of cycloaliphatic polyisocyanates include adducts of isophorone diisocyanate (IPDI).

The reactive mixture can further comprise a dimer of isocyanate trimerized to isocyanurate, an allophanate, a uretdione, a biuret, an amide or any other product containing molecules derived from the characteristic reactions of isocyanates (Polyurethane Handbook, Gunter Oertel, second edition, Hanser publishers, Munich, 1994, p. 73). For example, the isocyanurates can derive from diisocyanates selected from the group of diphenylmethane-4,4'-diisocyanate, diphenylmethane-2,4'-diisocyanate, hydrogenated derivatives of the aforementioned diisocyanates, toluene-2,4-diisocyanate, toluene-2,6-diisocyanate, hexamethylene diisocyanate, isophoronediisocyanate and mixtures thereof.

Preferably, the reactive mixture according to the invention comprises a trimerized isocyanate, generally comprising less than 0.2% by weight of free isocyanate monomers at the time of mixing.

The reactive mixture can further present an NCO/OH ratio between 1 and 2, and preferably between 1.1 and 1.4. The reactive mixture can further comprise, according to the invention, additives such as fillers, tackifiers, plasticizers, adhesion promoters such as compounds comprising silanyl groups, and catalysts to accelerate crosslinking. Suitable catalysts are, for example, metallic catalysts such as tin dibutyl dilaurate, bismuth neodecanoate or tertiary amines such as 1,4-diazabicyclo[2,2,2]octane (DABCO). The addition of additives makes it easier to respond to specific needs.

The reactive polyurethane mixture can thus present a solvent-free two-component form with:

a resin portion comprising at least one polyol, one polyamine and, if necessary, a catalyst, a dye, pigments, a filler, a wetting agent, an adhesion promoter, a UV stabilizer, an optical brightener, a flame retardant and an antioxidant; and a hardener portion comprising at least one polyisocyanate and, if necessary, a filler and/or various additives known to a person skilled in the art;

these two portions preferably being mixed just before the application of the mixture to the substrate.

The reactive mixture described above serves to control the viscosity, the cohesion build-up and the kinetics of obtaining a yield point of the mixture. It is accordingly possible to obtain a coating mixture that is sufficiently fluid to wet the substrate at the time of its application (by overcoming the yield point) and also, to obtain a rapid cohesion build-up after coating, in order to avoid passing through the substrate. In particular, it is possible to achieve a correct wetting of the substrate even if the latter presents high reliefs as in the case of embossed textiles. The coating of a substrate by the reactive mixture is furthermore not harmful to the properties of a substrate and, in particular, not harmful to its clinging properties when the textile is a self-clinging textile.

Thus, the method according to the invention significantly improves the back coating of substrates and can be implemented with substrates presenting a wide variety of textures. Suitable substrates include, for example, brushed yarn substrates, release papers, plastic films, particularly of polyester, polyamide, polypropylene and polyethylene, metallic films or plastic films comprising metallized wires, films with a wood veneer, fabrics with natural fibres (for example with cotton fibres), antistatic fabrics, artificial textile material based on cellulose (for example rayon).

EXAMPLES

Examples are given below of the chemical composition of the solvent-free reactive polyurethane mixture suitable for being supplied in step (i) of the method according to the invention.

Example 1

The reactive polyurethane mixture comprises a resin portion (A) and a hardener portion (B).
Portion A (resin)
The resin portion comprises the following components (followed by their percentage by weight, of a total of 100% of resin portion to within the residue amount):
aliphatic polyether-polyols (30.58%) with low molecular weights, that is on average between 400 and 450 and of which the functionality is 3;
aliphatic polyether-polyols (45.78%) with molecular weights of about 2800-3300 and of which the functionality is 3;
one or more crosslinking agents based on aromatic diamine (1.53%);
a wetting and dispersant additive based on a solution of carboxylic acid salt of polyamine amide (0.46%);
one or more anti-foaming agents based on a non-aqueous emulsion of a polysiloxane (0.23%);
one or more optical brighteners (0.03%);
one or more phenolic antioxidants (0.1%);
one or more light stabilizers, based on benzotriazole (0.19%);
a molecular sieve of the synthetic zeolite type (3.06%);
an aluminium trihydroxide filler (17.96%), with an average particle size of 9 micrometers.

The aluminium trihydroxide in this example is used as a filler in order to improve the fire resistance properties.

The rheological properties of the resin portion are as follows:
a viscosity, measured using a Brookfield viscometer (RVT model, spindle number 2 at 20 rpm) at 23° C. between 700 and 1000 mPa·s.
A density, measured by standard pycnometry at 23° C., between 1.16 and 1.18.

The mixture is prepared under nitrogen or under vacuum and benefits from intense stirring so that the paste can be prepared from the solids correctly according to the rules of the art.

The viscosity and density of the mixture are two important criteria for evaluating the conformity of the resin according to this example.
Portion B Hardener
The hardener portion comprises a diphenyl methane diisocyanate comprising high-functionality isomers and oligomers. The average NCO content is 31.2 and the density of the hardener is 1.23.

The NCO content is the important criterion for evaluating conformity of the hardener portion according to this example.

The resin/hardener ratio by weight is 100/40.8.

Naturally, other types and corresponding proportions of fillers, thixotropic agents, polyols and catalysts can be used in order to adjust the reactivity of the solvent-free reactive polyurethane mixture.

Example 2

By way of example of the preceding statement, it is possible to modify Example 1 by using an aluminium trihydroxide filler (17.96%) with an average particle size of 2 microns instead of 9 microns. This increases the Brookfield viscosity of the resin portion, that is, typically by 60-70%. Furthermore, the product obtained settles more slowly and is consequently more stable during its storage.

Example 3

It is further possible to obtain a less branched final coating, particularly by introducing a difunctional polyol. The reactive polyurethane mixture accordingly comprises a resin portion (A) and a hardener portion (B) of which the characteristics are as follows:
Portion A (resin)
The resin portion comprises the following components (followed by their percentage by weight, of a total of 100% of resin portion to within the residue amount):
aliphatic polyether-polyols (20.00%) with low molecular weights, that is on average between 400 and 450 and of which the functionality is 3;
aliphatic polyether-polyols (15.50%) with low molecular weights, that is on average between 380 and 420 and of which the functionality is 2;
aliphatic polyether-polyols (41.00%) with molecular weights of about 2800-3300 and of which the functionality is 3;
one or more crosslinking agents based on aromatic diamine (1.53%);
a wetting and dispersant additive based on a solution of carboxylic acid salt of polyamine amide (0.46%);
one or more anti-foaming agents based on a non-aqueous emulsion of a polysiloxane (0.23%);
one or more optical brighteners (0.03%);
one or more phenolic antioxidants (0.1%);

one or more light stabilizers, based on benzotriazole (0.19%);

a molecular sieve of the synthetic zeolite type (3.06%);

an aluminium trihydroxyde filler (17.96%), with an average particle size of 2 or 9 microns.

The Theological properties of the resin portion are nevertheless similar to those of the previous examples.

Portion B hardener: identical to Example 1.

The resin/hardener ratio by weight remains 100/40.8.

The invention is not limited to the embodiments described but is susceptible to numerous variations that are readily accessible to a person skilled in the art.

Without further elaboration, it is believed that one skilled in the art can, using the preceding description, utilize the present invention to its fullest extent. The preceding preferred specific embodiments are, therefore, to be construed as merely illustrative, and not limitative of the remainder of the disclosure in any way whatsoever.

In the foregoing and in the examples, all temperatures are set forth uncorrected in degrees Celsius and, all parts and percentages are by weight, unless otherwise indicated.

The entire disclosures of all applications, patents and publications, cited herein and of corresponding French application No. 03 07 971 filed Jul. 1, 2003 is incorporated by reference herein.

The preceding examples can be repeated with similar success by substituting the generically or specifically described reactants and/or operating conditions of this invention for those used in the preceding examples.

From the foregoing description, one skilled in the art can easily ascertain the essential characteristics of this invention and, without departing from the spirit and scope thereof, can make various changes and modifications of the invention to adapt it to various usages and conditions.

The invention claimed is:

1. A method for coating a substrate with a fluid, comprising:
   (i) supplying a substrate and a yield point fluid; and
   (ii) shearing the fluid and applying the fluid to the substrate;
      in which the fluid comprises a solvent-free reactive polyurethane mixture,
      wherein the fluid is able to flow when the shear stress exerted on the fluid overcomes the yield point of the fluid, and
      wherein the solvent-free reactive polyurethane mixture comprises:
         at least one polyether polyol with molecular weight between 200 and 9000 and with hydroxyl functionality between 2.0 and 4.6;
         at least one polyisocyanate; and
         at least one polyamine whose quantity represents 0.1 to 3% of the total weight of the reactive mixture.

2. A method for coating a substrate with a fluid according to claim 1, in which the solvent-free reactive polyurethane mixture has:
   a Brookfield viscosity at 23° C. of between 100 and 200 000 mPa·s; and
   a yield point between 1 and 5000 Pa; and
   the time needed for the mixture to obtain the yield point is between 1 and 20 seconds.

3. A method for coating a substrate with a fluid according to claim 1, in which the solvent-free reactive polyurethane mixture has:
   a Brookfield viscosity at 23° C. of between 200 and 4000 mPa·s; and
   a yield point between 10 and 500 Pa; and
   the time the time needed for the mixture to obtain the yield point is between 2 and 10 seconds.

4. A method for coating a substrate with a fluid according to claim 1, in which the viscosity of the fluid decreases when shear stress is applied to the fluid.

5. A method for coating a substrate with a fluid according to claim 1, in which the shearing in (ii) is obtained by setting the substrate in relative motion in relation to the fluid.

6. A method for coating a substrate with a fluid according to claim 1, further comprising:
   (iii) stretching the substrate, at least partially concomitantly with the fluid shearing.

7. A method for coating a substrate with a fluid according to claim 6, in which the substrate in (i) is a meshed substrate and in which (iii) is stretching of the meshes of the substrate.

8. A method for coating a substrate with a fluid according to claim 1, further comprising:
   (iv) heating the substrate, which can take place before and/or after the application of the fluid to the substrate.

9. A method according to claim 8, wherein the heating is conducted at least after the substrate is coated, said heating being conducted to increase fluidity of the solvent-free reactive polyurethane mixture containing a cross linking agent, and thereafter to crosslink the mixture.

10. A method according to claim 8, wherein the heating is conducted at least before the substrate is coated to improve wetting of the substrate by the fluid.

11. A method according to claim 1, wherein the polyol consists essentially of at least one aliphatic polyether-polyol having a functionality of 3.

12. A method according to claim 11, wherein the polyol comprises 2 types of polyols having different ranges of molecular weight: a polyol with a low average molecular weight of about 400-450 and a polyol of higher average molecular weight of about 2800-3300.

13. A method for coating a substrate with a fluid according to claim 1, in which the solvent-free reactive polyurethane mixture comprises at least one aromatic polyamine.

14. A method for coating a substrate with a fluid according to claim 1, in which the solvent-free reactive polyurethane mixture presents an NCO/OH ratio between 1 and 2.

15. A method for coating a substrate with a fluid according to claim 1, in which the solvent-free reactive polyurethane mixture presents an NCO/OH ratio between 1.1 and 1.4.

16. A method for coating a substrate with a fluid according to claim 1, in which the solvent-free reactive polyurethane mixture comprises a catalyst.

17. A method for coating a substrate with a fluid, comprising:
   (i) supplying a substrate and a yield point fluid; and
   (ii) shearing the fluid and applying the fluid to the substrate;
   (iii) stretching the substrate, at least partially concomitantly with the fluid shearing;
      in which the fluid comprises a solvent-free reactive polyurethane mixture,
      wherein the fluid is able to flow when the shear stress exerted on the fluid overcomes the yield point of the fluid,
   and wherein the solvent-free reactive polyurethane mixture has:
   a Brookfield viscosity at 23° C. of between 200 and 4000 mPa·s; and
   a yield point between 10 and 500 Pa; and
   the time needed for the mixture to obtain the yield point is between 1 and 20 seconds.

18. A method for coating a substrate with a fluid according to claim 17, in which the solvent-free reactive polyurethane mixture comprises:
at least one polyol;
at least one polyisocyanate; and
at least one polyamine whose quantity represents 0.1 to 3% of the total weight of the reactive mixture.

19. A method for coating a substrate with a fluid according to claim 17, in which the viscosity of the fluid decreases when shear stress is applied to the fluid.

20. A method for coating a substrate with a fluid according to claim 17, in which the shearing in (ii) is obtained by setting the substrate in relative motion in relation to the fluid.

21. A method according to claim 20, wherein the substrate is a moving strip and the relative speed of the substrate to the fluid is between 1 and 200 m/min.

22. A method according to claim 20, wherein the substrate is a moving strip and the relative speed of the substrate to the fluid is between 10 and 50 m/min.

23. A method for coating a substrate with a fluid according to claim 17, in which the substrate in (i) is a meshed substrate and in which (iii) is stretching of the meshes of the substrate.

24. A method for coating a substrate with a fluid according to claim 17, further comprising:
(iv) heating the substrate, which can take place before and/or after the application of the fluid to the substrate.

25. A method for coating a substrate with a fluid, comprising:
(i) supplying a substrate and a yield point fluid; and
(ii) shearing the fluid and applying the fluid to the substrate;
(iii) stretching the substrate, at least partially concomitantly with the fluid shearing;
in which the fluid comprises a solvent-free reactive polyurethane mixture,
wherein the fluid is able to flow when the shear stress exerted on the fluid overcomes the yield point of the fluid,
and wherein the solvent-free reactive polyurethane mixture comprises:
at least one polyol;
at least one polyisocyanate; and
at least one polyamine whose quantity represents 0.1 to 3% of the total weight of the reactive mixture.

26. A method for coating a substrate with a fluid according to claim 25, in which the shearing in (ii) is obtained by setting the substrate in relative motion in relation to the fluid.

27. A method for coating a substrate with a fluid according to claim 25, in which the substrate in (i) is a meshed substrate and in which (iii) is stretching of the meshes of the substrate.

28. A method for coating a substrate with a fluid according to claim 25, further comprising:
(iv) heating the substrate, which can take place before and/or after the application of the fluid to the substrate.

29. A method for coating a substrate with a fluid according to claim 25, in which the solvent-free reactive polyurethane mixture comprises at least one aromatic polyamine.

30. A method for coating a substrate with a fluid according to claim 25, in which the solvent-free reactive polyurethane mixture comprises at least one polyether polyol with molecular weight between 200 and 9000 and with hydroxyl functionality between 2.0 and 4.6.

31. A method for coating a substrate with a fluid according to claim 25, in which the solvent-free reactive polyurethane mixture presents an NCO/OH ratio between 1 and 2.

32. A method for coating a substrate with a fluid according to claim 25, in which the solvent-free reactive polyurethane mixture presents an NCO/OH ratio between 1.1 and 1.4.

33. A method for coating a substrate with a fluid according to claim 25, in which the solvent-free reactive polyurethane mixture comprises a catalyst.

34. A method for coating a substrate with a fluid, comprising:
(i) supplying a substrate and a yield point fluid; and
(ii) shearing the fluid and applying the fluid to the substrate;
in which the fluid comprises a solvent-free reactive polyurethane mixture,
wherein the fluid is able to flow when the shear stress exerted on the fluid overcomes the yield point of the fluid,
and in which the solvent-free reactive polyurethane mixture comprises:
a resin portion comprising at least one polyol and at least one polyamine whose quantity represents 0.1 to 3% of the total weight of the reactive mixture; and
a hardener portion comprising at least one polyisocyanate, wherein the resin portion and hardener portion are mixed together to form the mixture.

35. A method for coating a substrate with a fluid according to claim 34, in which the solvent-free reactive polyurethane mixture has:
a Brookfield viscosity at 23° C. of between 100 and 200 000 mPa·s; and
a yield point between 1 and 5000 Pa; and
the time needed for the mixture to obtain the yield point is between 1 and 20 seconds.

36. A method for coating a substrate with a fluid according to claim 34, in which the viscosity of the fluid decreases when shear stress is applied to the fluid.

37. A method for coating a substrate with a fluid according to claim 34, in which the shearing in (ii) is obtained by setting the substrate in relative motion in relation to the fluid.

38. A method for coating a substrate with a fluid according to claim 34, further comprising:
(iii) stretching the substrate, at least partially concomitantly with the fluid shearing.

39. A method for coating a substrate with a fluid according to claim 38, in which the substrate in (i) is a meshed substrate and in which (iii) is stretching of the meshes of the substrate.

40. A method for coating a substrate with a fluid according to claim 34, further comprising:
(iv) heating the substrate, which can take place before and/or after the application of the fluid to the substrate.

41. A method for coating a substrate with a fluid according to claim 34, in which the solvent-free reactive polyurethane mixture comprises at least one aromatic polyamine.

42. A method for coating a substrate with a fluid according to claim 34, in which the solvent-free reactive polyurethane mixture comprises at least one polyether polyol with molecular weight between 200 and 9000 and with hydroxyl functionality between 2.0 and 4.6.

43. A method for coating a substrate with a fluid according to claim 34, in which the solvent-free reactive polyurethane mixture presents an NCO/OH ratio between 1 and 2.

44. A method for coating a substrate with a fluid according to claim 34, in which the solvent-free reactive polyurethane mixture presents an NCO/OH ratio between 1.1 and 1.4.

45. A method for coating a substrate with a fluid according to claim 34, in which the solvent-free reactive polyurethane mixture comprises a catalyst.

46. A method according to claim 34, wherein the polyol consists essentially of at least one aliphatic polyether-polyol having a functionality of 3.

47. A method according to claim 46, wherein the polyol comprises 2 types of polyols having different ranges of molecular weight: a polyol with a low average molecular weight of about 400-450 and a polyol of higher average molecular weight of about 2800-3300.

* * * * *

UNITED STATES PATENT AND TRADEMARK OFFICE
CERTIFICATE OF CORRECTION

| | | |
|---|---|---|
| PATENT NO. | : 8,034,405 B2 | Page 1 of 1 |
| APPLICATION NO. | : 12/501753 | |
| DATED | : October 11, 2011 | |
| INVENTOR(S) | : Miskovic et al. | |

It is certified that error appears in the above-identified patent and that said Letters Patent is hereby corrected as shown below:

Column 10, line 1 reads "time the time needed for the mixture to obtain the yield" should read -- the time needed for the mixture to obtain the yield --

Signed and Sealed this
Twentieth Day of December, 2011

David J. Kappos
*Director of the United States Patent and Trademark Office*